UNITED STATES PATENT OFFICE.

ADOLPH MAYER, OF CHICAGO, ILLINOIS.

LUMP-FUEL OF COAL, CHARCOAL, OR COKE SCREENINGS.

SPECIFICATION forming part of Letters Patent No. 433,653, dated August 5, 1890.

Application filed December 5, 1889. Serial No. 332,711. (No specimens.)

*To all whom it may concern:*

Be it known that I, ADOLPH MAYER, of Chicago, in the county of Cook and State of Illinois, have invented certain new and useful Improvements in Lump or Block Fuel of Coal, Coke, or Charcoal Screenings, of which the following is a specification.

My invention relates to a new article of manufacture comprising a lump-fuel of coal or coke screenings or dust of any convenient size and shape to be used in a furnace or other heating apparatus for fuel purposes.

In preparing my new fuel I use a quantity of screenings, slack or dust of either anthracite or bituminous coal, or of coke or charcoal, and mix the same thoroughly with a glutinous substance—such as the flour of wheat, rye, barley, or other grain—and with an oleaginous substance—such as lard—and after adding a quantity of fibrous substance—such as paper-pulp, wool, hair, or cotton waste—and a plastic substance—such as clay, plaster, or cement—I add a quantity of rosin, finely-powdered glass, and saltpeter. These materials are thoroughly and intimately mixed in a dry state in a suitable mixing-machine. I then take a quantity of either hot or cold water and dissolve therein a small per cent. of silicate of soda and add the same to the combustible compound first mentioned. The whole mass being now thoroughly mixed, is taken to a suitable press and molded into any desirable size or form for convenience in use. It will be understood, of course, that the composition may be dried in a mass and broken into lumps for use, if desired.

The purpose of employing a glutinous substance is to give adhesiveness to the particles of screenings or coal-dust used; and I find it necessary to use only a small quantity in proportion to the quantity of screenings used. I have found, for example, that with from eighty per cent. to ninety per cent. of the screenings it will be necessary to use only from one-half per cent. to four per cent. of glutinous substance, in order to produce lumps of fuel sufficiently hard to withstand the necessary handling before they are burned, and which will retain their form while burning.

The oleaginous or unctuous substance may be any kind of lard, oil, or grease, the object of its use being to make the lump of fuel to some extent water-proof, so that if exposed to the weather the glutinous substance will not be softened or dissolved by the moisture, and the lumps will retain their form under such circumstances. The finely-powdered glass is used for the same purpose, and a very small percentage of the glass and of the oleaginous substance will be required. The plastic substance is used, together with the fibrous substance, to give additional cohesiveness to the whole mass. The rosin adds to the combustible quality, while the saltpeter or salt tends to produce an evenness and uniformity of combustion.

In carrying my invention into practice I introduce the oleaginous substance by first making an emulsion of the same with a small quantity of water, and thereafter mixing the emulsion with the other ingredients. By proceeding in this manner the oleaginous material will become thoroughly distributed throughout the screenings, so that when the lumps formed either by pressure in the molds or otherwise are dried they may be exposed to moisture or immersed in water without danger of becoming disintegrated by the action of the moisture or water upon the glutinous components thereof.

To manufacture my proposed composition I take from eighty per cent. to ninety per cent. of screenings, slack, or coal-dust and mix therewith from one-half per cent. to four per cent. of wheat-flour. I may use rye, oats, buckwheat, rice, barley, or other grain, or the same percentage of starch or sugar in lieu of the wheat-flour. I then add one-fourth per cent. to four per cent. of rosin, one-eighth per cent. to two per cent. of paper-pulp or other fibrous substance, six per cent. to fourteen per cent. of clay or other plastic substance, one per cent. to three per cent. of broken glass finely powdered, and thoroughly mix the same in a dry state. I then take, say, one-half per cent. of lard or other oleaginous substance and make an emulsion thereof with a small quantity of water, hot or cold, and then mix the emulsion carefully into the first-mentioned compound. I then dissolve from one-half per cent. to three per cent. of silicate of soda in a quantity of water. Where one ton of the combustible matter is used I take from two hundred to two hundred and fifty pounds of the water containing the silicate of soda. The compound is thoroughly mixed, either by hand or some suitable machine.

The moist masses of adhering particles formed after mixing the ingredients described may be burned without further preparation; but for use in heating or cooking stoves it is preferable to convert the mass into lumps or blocks of uniform size by pressing the same into some suitable mold. When thus formed into lumps, the fuel is more convenient to handle, and when formed under pressure will burn more slowly. The lumps may be of any desired form or shape, according to the use to which the fuel may be put. For example, they may be egg-shaped, cylindric, spherical, or block-shaped. When formed under pressure, the blocks may be burned immediately when taken from the mold in a moist condition, inasmuch as they become hardened as soon as exposed to the heat of the fire.

Before the water containing the silicate of soda is added to the combustible ingredients I add to the latter a small quantity of salt or saltpeter—that is, in about one ton of the combustible compound I use two or three handfuls of salt or saltpeter.

When composition fuel is to be used for domestic purposes, I prefer to omit the rosin, thus doing away with any disagreeable odor. Where the fuel is to be used in small grates, as in stoves used for domestic purposes, I prefer to use the very minimum amount of powdered glass, and in some cases I entirely omit the glass. I thus do not desire to be restricted to the use of glass and rosin at all times.

What I claim is—

As a new article of manufacture, a lump or block fuel composed of coal, coke, or charcoal screenings or dust, a glutinous substance, such as flour, an oleaginous substance, such as lard, a plastic substance, such as plaster, and a fibrous substance, such as hair, combined with silicate of soda in proportions substantially as specified.

In testimony that I claim the foregoing as my invention I affix my signature in presence of two witnesses.

ADOLPH MAYER.

Witnesses:
TAYLOR E. BROWN,
HARRY COBB KENNEDY.